(12) United States Patent
Rico Alvarino et al.

(10) Patent No.: US 12,022,448 B2
(45) Date of Patent: Jun. 25, 2024

(54) CARRIER SWITCHING FOR MULTIPLE CARRIERS USING THE SAME COMPONENTS OF A COMPONENT PATH

(71) Applicant: QUALCOMM Incorporated, San Diego, CA (US)

(72) Inventors: Alberto Rico Alvarino, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/058,693

(22) Filed: Aug. 8, 2018

(65) Prior Publication Data
US 2019/0053237 A1 Feb. 14, 2019

Related U.S. Application Data

(60) Provisional application No. 62/544,568, filed on Aug. 11, 2017.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0039* (2013.01);
(Continued)

(58) Field of Classification Search
CPC ........... H04W 72/0453; H04W 72/048; H04W 72/08; H04L 5/0039; H04L 5/0098;
(Continued)

(56) References Cited

U.S. PATENT DOCUMENTS 8,433,251 B2 4/2013 Chen et al.
2010/0215011 A1* 8/2010 Pan .......................... H04L 5/14
370/329
(Continued)

FOREIGN PATENT DOCUMENTS

CN 104104395 A 10/2014
JP 2013516869 A 5/2013
(Continued)

OTHER PUBLICATIONS

62506462,Specification,May 15, 2017 (Year: 2017).*
(Continued)

*Primary Examiner* — Yu-Wen Chang
(74) *Attorney, Agent, or Firm* — Norton Rose Fulbright US LLP

(57) ABSTRACT

Component carriers (CC)s that share components of a component chain are effected when components of the component chain are adjusted for one or more of the CCs. Systems switch CCs that share a component chain according to methods that alleviate drawbacks associated with sharing a component chain. In embodiments, CCs that share a component chain are identified as switching groups and are switched from default CCs to alternative CCs as a group to compensate for adjustments made in the shared component chain. Other aspects and features are also claimed and described.

32 Claims, 7 Drawing Sheets

(51) Int. Cl.
*H04W 72/0453* (2023.01)
*H04W 72/51* (2023.01)
*H04W 72/54* (2023.01)

(52) U.S. Cl.
CPC .......... *H04L 5/0048* (2013.01); *H04L 5/0098* (2013.01); *H04W 72/51* (2023.01); *H04W 72/54* (2023.01); *H04L 5/0064* (2013.01); *H04L 5/0087* (2013.01)

(58) Field of Classification Search
CPC ..... H04L 5/001; H04L 5/0048; H04L 5/0064; H04L 5/0087
See application file for complete search history.

(56) References Cited

U.S. PATENT DOCUMENTS

| | | |
|---|---|---|
| 2010/0240406 A1 | 9/2010 | Tseng et al. |
| 2011/0194630 A1* | 8/2011 | Yang ............... H04L 1/0025 375/260 |
| 2011/0205976 A1 | 8/2011 | Roessel et al. |
| 2012/0218973 A1 | 8/2012 | Du et al. |
| 2012/0218988 A1* | 8/2012 | Xu ............... H04W 56/0045 370/350 |
| 2012/0263067 A1* | 10/2012 | Kim ............... H04B 7/2045 370/252 |
| 2012/0281527 A1* | 11/2012 | Sebire ............... H04W 76/19 370/228 |
| 2012/0282969 A1* | 11/2012 | Jiang ............... H04W 74/085 455/517 |
| 2013/0177091 A1 | 7/2013 | Lim et al. |
| 2013/0188612 A1 | 7/2013 | Dinan et al. |
| 2013/0301444 A1* | 11/2013 | Sachs ............... H04L 5/001 370/252 |
| 2014/0010192 A1* | 1/2014 | Chang ............... H04L 5/001 370/329 |
| 2014/0307599 A1 | 10/2014 | Rousu |
| 2014/0362811 A1 | 12/2014 | Lin et al. |
| 2015/0055589 A1 | 2/2015 | Yerramalli et al. |
| 2015/0223087 A1* | 8/2015 | Yu ............... H04W 76/36 455/418 |
| 2015/0245347 A1* | 8/2015 | Yi ............... H04W 72/0446 370/280 |
| 2015/0256300 A1* | 9/2015 | Lin ............... H04W 76/18 370/242 |
| 2015/0282174 A1 | 10/2015 | Takeda et al. |
| 2015/0327103 A1 | 11/2015 | Tang et al. |
| 2016/0100420 A1 | 4/2016 | Chen et al. |
| 2016/0142027 A1 | 5/2016 | Yu et al. |
| 2016/0150571 A1 | 5/2016 | Pelletier et al. |
| 2016/0248573 A1 | 8/2016 | Xu et al. |
| 2016/0352493 A1* | 12/2016 | Tan Bergstrom ..... H04L 5/0098 |
| 2017/0201967 A1* | 7/2017 | Yang ............... H04L 5/143 |
| 2017/0302419 A1* | 10/2017 | Liu ............... H04W 48/12 |
| 2019/0165908 A1* | 5/2019 | Takeda ............... H04W 72/0413 |
| 2019/0199555 A1* | 6/2019 | Munier ............... H04L 5/0051 |
| 2019/0222402 A1* | 7/2019 | Yang ............... H04L 5/0082 |
| 2019/0246427 A1* | 8/2019 | Mukherjee ............... H04L 27/2607 |
| 2019/0373602 A1* | 12/2019 | Qin ............... H04L 5/00 |
| 2020/0092055 A1* | 3/2020 | Choi ............... H04L 5/0091 |
| 2020/0112959 A1* | 4/2020 | Gong ............... H04L 27/2602 |
| 2020/0322187 A1* | 10/2020 | He ............... H04L 5/0055 |
| 2020/0382250 A1* | 12/2020 | Choi ............... H04W 72/0413 |

FOREIGN PATENT DOCUMENTS

| | | |
|---|---|---|
| JP | 2014078807 A | 5/2014 |
| JP | 2017517193 A | 6/2017 |
| WO | WO-2011038405 | 3/2011 |
| WO | WO-2011115347 A1 | 9/2011 |
| WO | WO-2011116183 A1 | 9/2011 |
| WO | WO-2013103545 A1 | 7/2013 |
| WO | WO-2014022806 A2 | 2/2014 |
| WO | WO-2015027139 A2 | 2/2015 |
| WO | WO-2016053660 | 4/2016 |
| WO | WO-2016114549 A1 | 7/2016 |

OTHER PUBLICATIONS

International Search Report and Written Opinion—PCT/US2018/045972—ISA/EPO—dated Jan. 20, 2019.
Taiwan Search Report—TW107127787—TIPO—dated Sep. 25, 2021.
Taiwan Search Report—TW107127787—TIPO—dated Dec. 22, 2021.
Nokia., et al., "On NR CA/DC Configuration", 3GPP TSG-RAN WG1 Meeting NR#2, R1-1710884, Qingdao, China, Jun. 27-30, 2017, 5 Pages.
Samsung: "Dynamic Carrier Swtich For NR", 3GPP TSG-RAN WG2#97, R2-1701532, Athens, Greece, Feb. 13-17, 2017, 3 Pages.

* cited by examiner

CARRIER SWITCHING FOR MULTIPLE CARRIERS USING THE SAME COMPONENTS OF A COMPONENT PATH

CROSS-REFERENCE TO RELATED APPLICATIONS

This application claims the benefit of and priority to U.S. Provisional Patent Application No. 62/544,568, entitled, "CARRIER SWITCHING FOR MULTIPLE CARRIERS USING THE SAME COMPONENTS OF A COMPONENT PATH," filed on Aug. 11, 2017 (175803P1), which is expressly incorporated by reference herein in its entirety as if fully set forth below and for all applicable purposes.

TECHNICAL FIELD

Aspects of the present disclosure relate generally to wireless communication systems, and more particularly, to component carriers switching. Certain embodiments group wireless carriers based on carriers sharing a component path, and enable techniques in which carriers within a carrier group are switched to increase throughput for one or more carriers of a carrier group.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. Interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for switching component carriers (CC)s is provided. For example, a method can include identifying two or more CCs of as being of a switching group; determining whether to switch one or more of the CCs of the switching group to alternative one or more CCs or not switch the one or more of the CCs of the switching group to the one or more alternative CCs; and based on the determining, transmitting via at least one of a first CC of the switching group or via an alternative CC of the first CC.

In an additional aspect of the disclosure, an apparatus configured switching component carriers (CC)s is provided. For example, the apparatus can include one or more processor that identifies two or more CCs of as being of a switching group and determines whether to switch one or more of the CCs of the switching group to one or more alternative CCs or not switch one or more of the CCs of the switching group to the one or more alternative CCs; and a transmitter that transmits via at least one of a first CC of the switching group or via an alternative CC of the first CC based on the one or more processor's determination.

In an additional aspect of the disclosure, an apparatus configured for switching component carriers (CC)s is provided. For example, the apparatus can include means for identifying two or more CCs as being of a switching group; means for determining whether to switch one or more of the CCs of the switching group to one or more alternative CCs or not switch one or more of the CCs of the switching group to the one or more alternative CCs; and based on the determining, means for transmitting via at least one of a first CC of the switching group or via an alternative CC of the first CC.

In an additional aspect of the disclosure, a non-transitory computer-readable medium having program code recorded thereon is provided. The program code can include code for identifying two or more CCs of as being of a switching group; code for determining whether to switch one or more of the CCs of the switching group to alternative CCs or not switch the one or more of the CCs of the switching group to the alternative CCs; and based on the determining, code for transmitting via at least one of a first CC of the switching group or via an alternative CC of the first CC.

In one aspect of the disclosure, a method for switching component carriers (CC)s is provided. For example, a method can include identifying two or more CCs of as being of a switching group; receiving at least one of: a first CC of the switching group or an alternative CC of the first CC; determining whether the received at least one CC is the first CC or the alternative CC of the first CC; and decoding the received at least one CC based at least on the determining.

In an additional aspect of the disclosure, an apparatus configured switching component carriers (CC)s is provided. For example, the apparatus can include one or more processor that identifies two or more CCs of as being of a switching group; and one or more receiver that receives at least one of: a first CC of the switching group or an alternative CC of the first CC, wherein the one or more processor further determines whether the received at least one CC is the first CC or the alternative CC of the first CC and decides the received at least one CC based at least on the determining.

In an additional aspect of the disclosure, an apparatus configured for switching component carriers (CC)s is provided. For example, the apparatus can include means for identifying two or more CCs of as being of a switching group; means for receiving at least one of: a first CC of the switching group or an alternative CC of the first CC; means for determining whether the received at least one CC is the first CC or the alternative CC of the first CC; and means for decoding the received at least one CC based at least on the determining.

In an additional aspect of the disclosure, a non-transitory computer-readable medium having program code recorded thereon is provided. The program code can include code for identifying two or more CCs of as being of a switching group; code for receiving at least one of: a first CC of the switching group or an alternative CC of the first CC; code for determining whether the received at least one CC is the first CC or the alternative CC of the first CC; and code for decoding the received at least one CC based at least on the determining.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
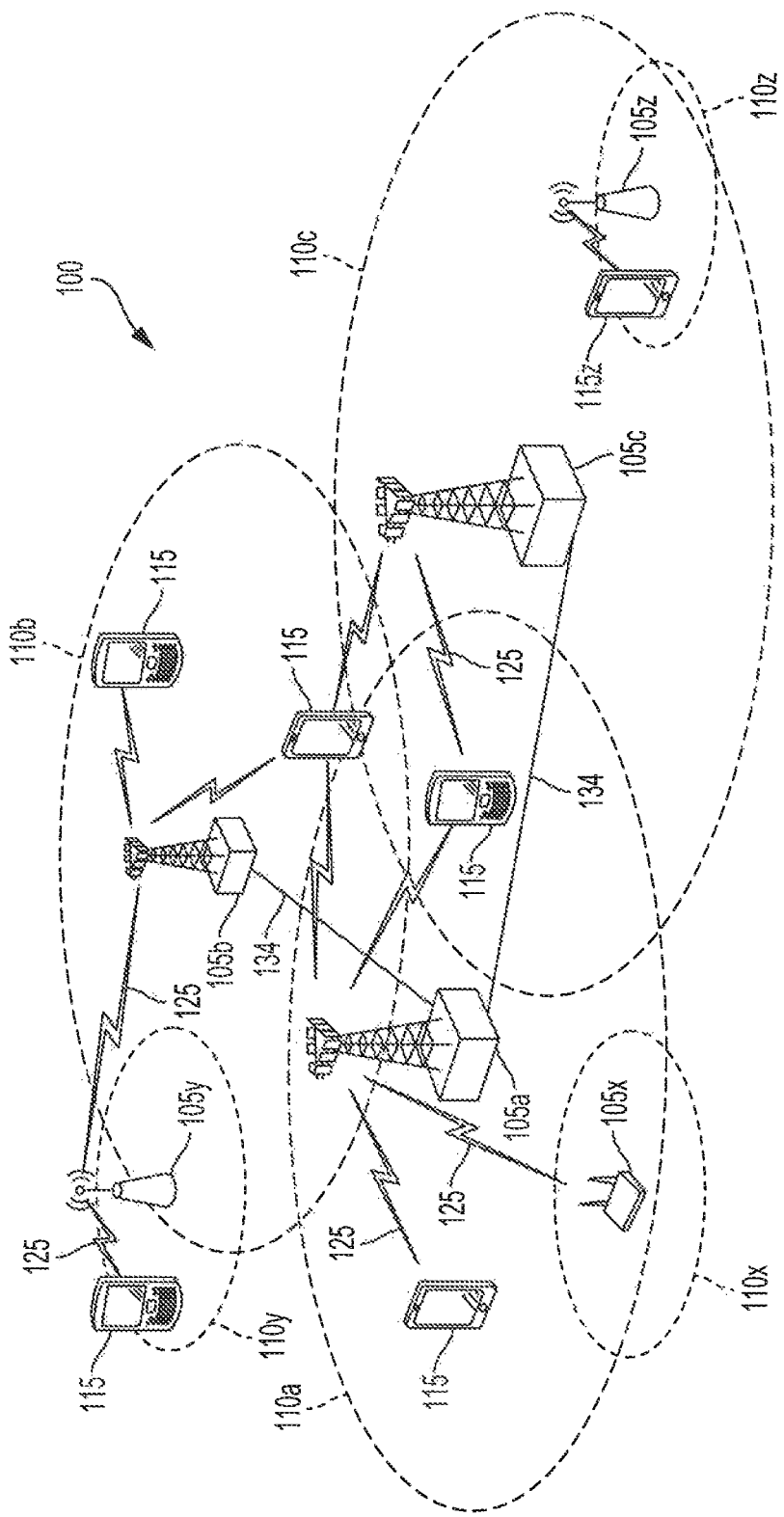
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
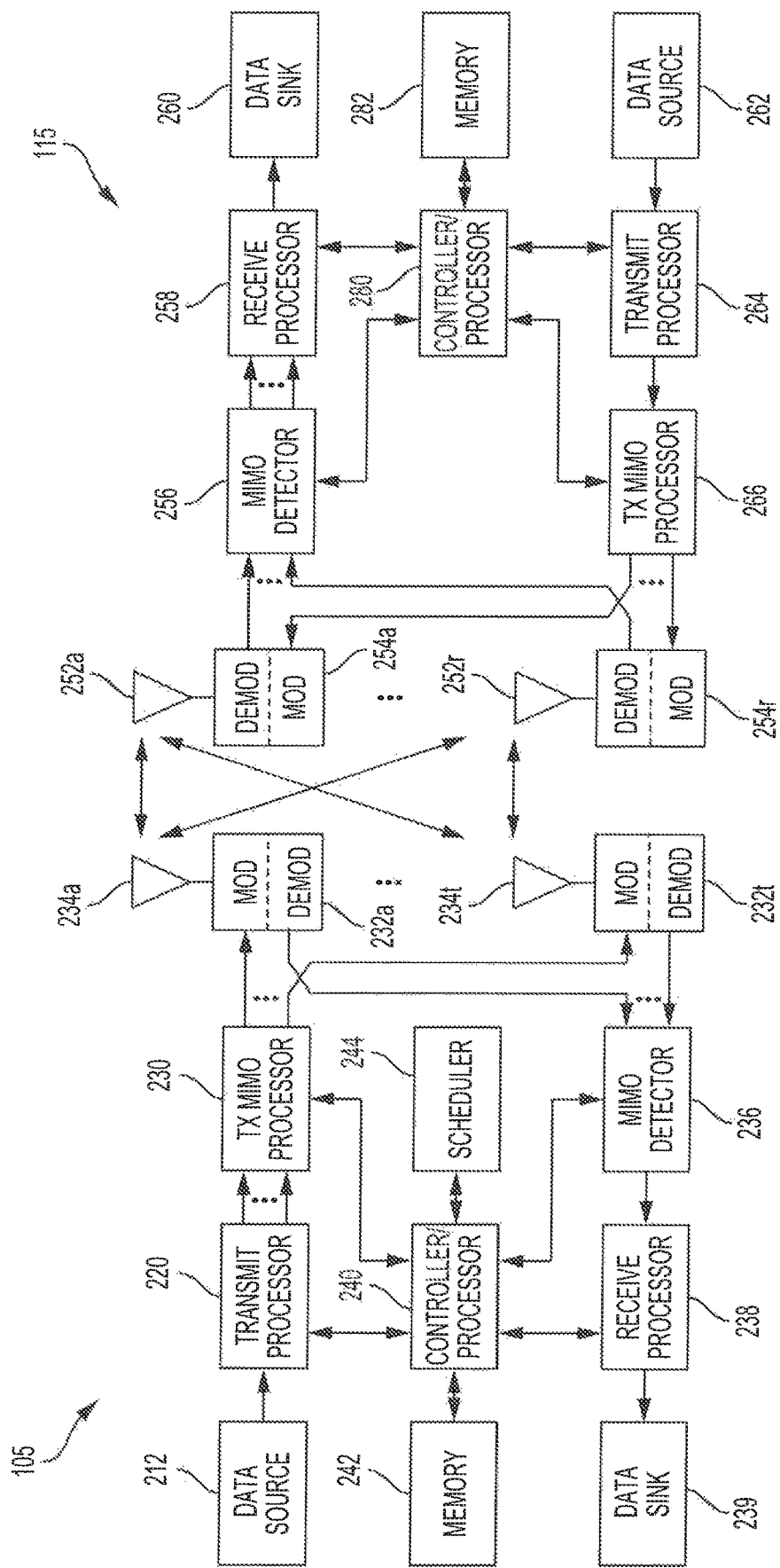
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4-7, and/or other processes for the techniques described herein. Memories 242 and 282 may store data and program codes for gNB 105 and UE 115, respectively. Scheduler 244 may schedule UEs for data transmission on the downlink and/or uplink.

A UE 115 may send one or more Sounding Reference Signal (SRS) on UL, which assists a base station 105, for example, estimate bandwidth channel quality, estimate uplink timing, and more. In Time Division Duplexing (TDD) cases, the SRS transmission may be used by the eNB to estimate the downlink propagation channel. In embodiments, UE 115 may be configured to send SRS or any uplink channel on an assigned component carrier (e.g., CC1 or first component carrier). An assigned CC1 may be a primary component carrier, which may be considered a default component carrier. There may be any number of methods used when assigning CC1. For example, assigning UE's 115 CC1 may be based in part on, Channel Quality Indicators (CQIs), traffic type, network contestability, Network Proprietary Ownership (e.g., FFA, AT&T, Verizon, etc. may own certain component carriers), and/or the like. In short, UE 115 may be configured to send SRS on a default component carrier, CC1. However, from time to time circumstances may arise wherein it may be advantageous for UE 115 to temporarily switch to an alternative component carrier (e.g., CC1x or CCx) for one or more SRS transmissions. In embodiments, once a given advantage expires, after some passage of time, for operational desires, or for no reason, the UE 115 may default back to CC1.

When UE 115 switches from default CC1 to alternative CC1x, the SRS communication may benefit from retuning a Phase Lock Loop (PLL) within CC1x's component path of transmission. Further, when UE 115 switches from default CC1 to CC1x, the communication may benefit from reconfiguring a Power Amplifier (PA) within CC1x's component path of transmission. If the PLL, PA, and other components within the component path only services CC1, then switching between CC1 and CC1x and adjusting and readjusting the PLL, PA, etc. may be of little consequence to other CCs.

UEs are becoming increasingly small and thin and mobile, while at the same time users demand UEs provide more services faster. More services typically equates to more software/hardware components to handle increased data traffic and computations. However, the small size of UEs makes the addition of components quite difficult. In short, real estate within a UE is growing more and more scarce. Further, hardware/software components generate heat and limited space within a UE reduces the number and size of heat sinks and/or other means of dissipating heat. Compounding heat issues includes the industry's move from microwaves to millimeter waves, which increases data rates yet causes increased heat generation due to the frequency of beam forming in response to millimeter waves' reduced wave propagation.

In an effort to reduce the real estate and heating problems, many UEs are designed to service multiple difference communications and CCs using the same component path to transmission (e.g., PLL, PA, other RF components, switches, etc.) or portions of the same component path to transmission. In short, the same components of a path are shared to service different types of communications. Sharing components reduces the number of components within a UE, which helps alleviate real estate issues and heat issues described above. In some cases, sharing some components to transmission may be based on tight RF requirements that cannot be met with separate components (e.g. emission requirements for intra-band carrier aggregation)

The solution of shared component paths and/or shared portions of component paths leads to new unexpected problems. For instance, when a UE uses the same (or portions of the same) component path to service multiple CCs, adjusting some or all components of the component path to service one of the CCs may cause challenges for the other CCs using the same (or portions of the same) component path. In example UEs, many hardware/software components of a UE may be linked in series thereby causing the adjusting, altering, retuning, reconfiguration, etc. of components of a component path to effect other communications that are routed through some or all of the component path.

Figure 3:
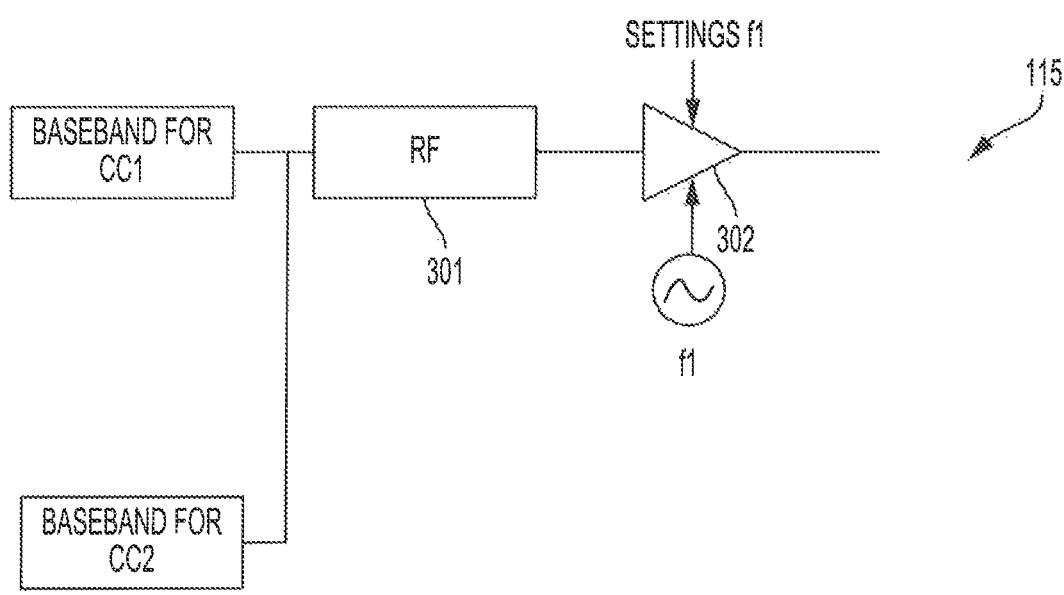
FIG. 3 is a block diagram illustrating an example design of a shared component path according to some embodiments of the present disclosure.

Specifically, the assigned CC used to send UE's 115 SRS (e.g., CC1) may share the same baseband and/or other components as a CC used to send other information of UE 115 (e.g., CC2). FIG. 3 shows example UE 115, wherein CC1 and CC2 share the same RF 301 and PA 302. In embodiments, CC1 and CC2 may share the same baseband, RF, and/or PA. Of course, CC1 and CC2 may share any combination of the above and may share additional hardware/software components. For instance, CC1 and CC2 may share the same PA but may not share the same RF; CC1 and CC2 may share the same RF but not the same PA; and CC1 and CC2 may share and/or not share any component of a UE as is designed by the UE's particular architecture.

For the sake of explanation, the specification gives examples in light of CC1 and CC2. However, any number of CCs may share one or more hardware/software components of a UE. As such, when CC1 and CC2 are described, it should be understood that a group of CCs may include any number of CCs (e.g., CC1 to CC1+n), and the methods and systems disclosed herein are applicable thereto. Further, for the sake of explanation, the present disclosure gives examples of shared component paths including shared basebands, RFs, and/or PAs. Nevertheless, any number of hardware/software components of a UE may be shared in a manner such that adjusting one or more components for a given CC may disrupt the transmission of another CC, and the methods and systems disclosed herein are applicable thereto. Further, it should be understood that systems and methods herein are applicable at least to microwave and millimeter wave transmissions.

As explained above, from time to time circumstances may arise wherein it may be advantageous for UE 115 to temporarily transmit SRS information using an alternative CC. For example, UE 115 may temporarily switch from default CC1 to a different component carrier (e.g., CC1x) for one or more SRS transmissions. In embodiments, once a given transmission happens, UE 115 may default back to CC1. Due to the UE's shared component paths, when CC1 switches to CC1x, the switch may have a detrimental effect on other communications (e.g., CC2). For example, one or more shared components of the shared component path may be adjusted, altered, retuned, reconfigured, etc. based on CC1 switching to CC1x. An unexpected problem arises because adjusting one or more components of a shared component path to assist the switch from CC1 to CC1x may reduce the throughput of CC2 and/or interrupt the communication during the switch. As such, a solution to the shared component path problem is desired.

Figure 4:
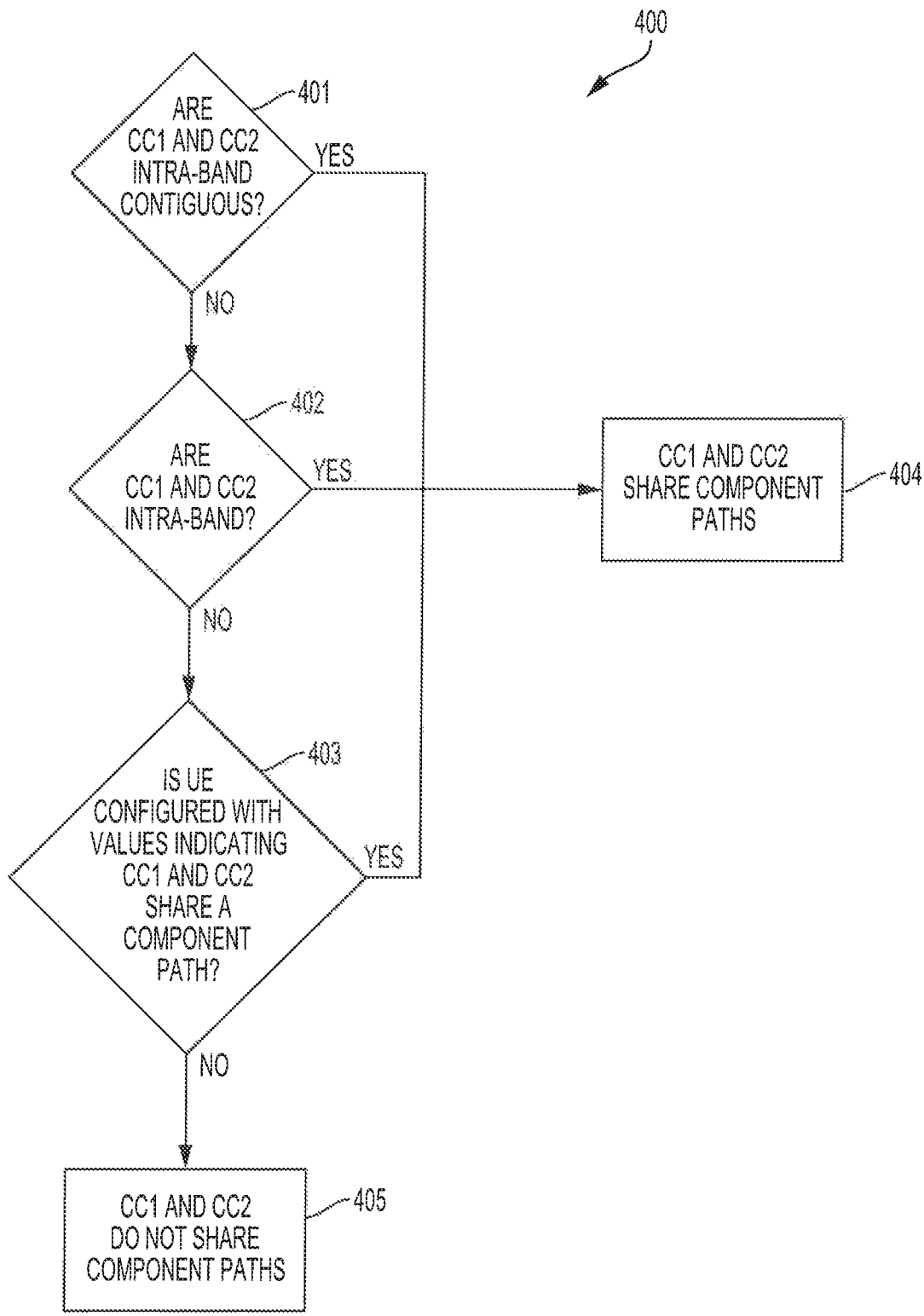
FIG. 4 is an example process according to some embodiments of the present disclosure.

In embodiments, systems and methods may benefit from determining whether one or more CCs share some or all components of a component path. FIG. 4 shows example methods of making this determination. Determining whether one or more CCs share a component path may be based on implicit information, explicit information, and/or a combination of implicit and explicit information. In an example based on implicit information, one or more processor may determine whether CC1 and CC2 are intra-band contiguous (step 401). If CC1 and CC2 are intra-band contiguous, then the one or more processor may decide that CC1 and CC2 share some or all of the same component path (step 404). Further, regarding implicit information, one or more processor may determine whether CC1 and CC2 are intra-band (step 402). If CC1 and CC2 are intra-band, then the one or more processor may decide that CC1 and CC2 share some or all of the same component path (step 404). If CC1 and CC2 are not intra-band contiguous and/or are not intra-band, then the one or more processors may determine that CC1 and CC2 do not share a component path (step 405). The one or more processors may be one or more UE processor and/or one or more network processor (e.g., base station). In some cases, CC1 and CC2 may be determined to share some of all of the same component path if they belong to the same timing advance group and/or have the same cyclic prefix and/or are located in the same band.

In some scenarios, determining whether one or more CC share a component path may be made based on explicit information. For example, a UE may signal to a base station which CCs share some or all of the same component path. For instance, UE 115 may signal to base station 105 that CC1 and CC2 share some or all components of a component path. The UE's determination of which CCs use some or all of the same component path may be based on implicit information and/or explicit information. For example, the UE may implicitly determine the information as described above (steps 401 and/or 402) Further, the UE may be configured with values indicating which CCs share component paths (step 403). If the UE is configured with values indicating that CC1 and CC2 share component paths, then the one or more processor may decide that CC1 and CC2 share some or all of the same component path (step 404). If not, the UE may decide that CC1 and CC2 do not share a component path (step 405). Information regarding whether CC1 and CC2 share a component path may be determined by a base station or explicitly communicated to a base station. A UE's knowledge of which CCs share a component path may be used to determine switching techniques for the CCs, as is explained in detail below. Further, a base station's knowledge of which CCs share a component path may be used to anticipate switching techniques that a UE may use for the CCs, which may assist the base station in receiving and decoding information transmitted via the CCs.

As explained, when two or more CCs (e.g., CC1, CC2, etc.) share some or all of a component path, adjusting one or more components of a shared component path to assist switching from CC1 to CC1x may reduce the throughput of CC2. In embodiments, when CC1 is switched to CC1x, UE 115 may refrain from transmitting information via CC2 while components of the shared component path are in their adjusted state (e.g., non-default state). Further, after the components of the shared component path return to their default state, UE 115 may send information via CC2.

While in the adjusted state, UE 115 may determine whether information intended for CC2 should be transmitted. If UE 115 determines that information intended for CC2 would benefit from waiting until components of the component path return to the default state, the UE 115 may delay the transmission of information intended for CC2 until the default setting of the shared components are restored. Determining whether to delay information intended for CC2 may be based at least on the type of information being transmitted, service requirements tied to the information, error detection rate issues, whether the information is Acknowledgment/Negative Acknowledgment (ACK/NACK) information, and/or the like. In embodiments, determining whether to delay the information intended for CC2 may be based on the component adjustment's effect on CC2. If the component adjustments are determined to be beneficial to CC2, then UE 115 may transmit via CC2 while the component path is in its adjusted state. Further, if UE 115 determines that an estimated disturbance to CC2 is below a threshold disturbance rate/value, UE 115 may choose to transmit information via CC2 while components of the component path are in its adjusted state. However, if UE 115 determines that an estimated disturbance to CC2 is above a threshold disturbance rate/value, UE 115 may choose to delay transmission via CC2 until components of the component path are restored to their default state. Further still, UE 115 may be configured to delay transmission via CC2 until components of the component path are restored to their default state regardless of the effect the components may have on CC2.

In situations, UE 115 may decide not to delay the information intended for CC2, but at the same time, the adjusted components of the shared component path are not conducive to transmitting via CC2 and/or UE 115 is configured not to transmit on CC2 when components of a shared component path in an adjusted state. In embodiments, when CC1 is switched to CC1x, it may be desirable for UE 115 to switch CC2 to an alternative CC (e.g., CC2x), so that the adjustments performed on the shared components to support CC1x also support the transmission of the information (or an alternative set of information or signal, such as SRS) on CC2x. For example, based on the adjustments of the shared components, UE 115 may switch CC2 to a CC2x that performs well with the adjusted settings of the shared components. UE 115 may determine which CC would perform well based on the adjusted settings. Further, UE 115 may be configured to switch CC2 to CC2x when CC1 is switched to CC1x.

Figure 5:
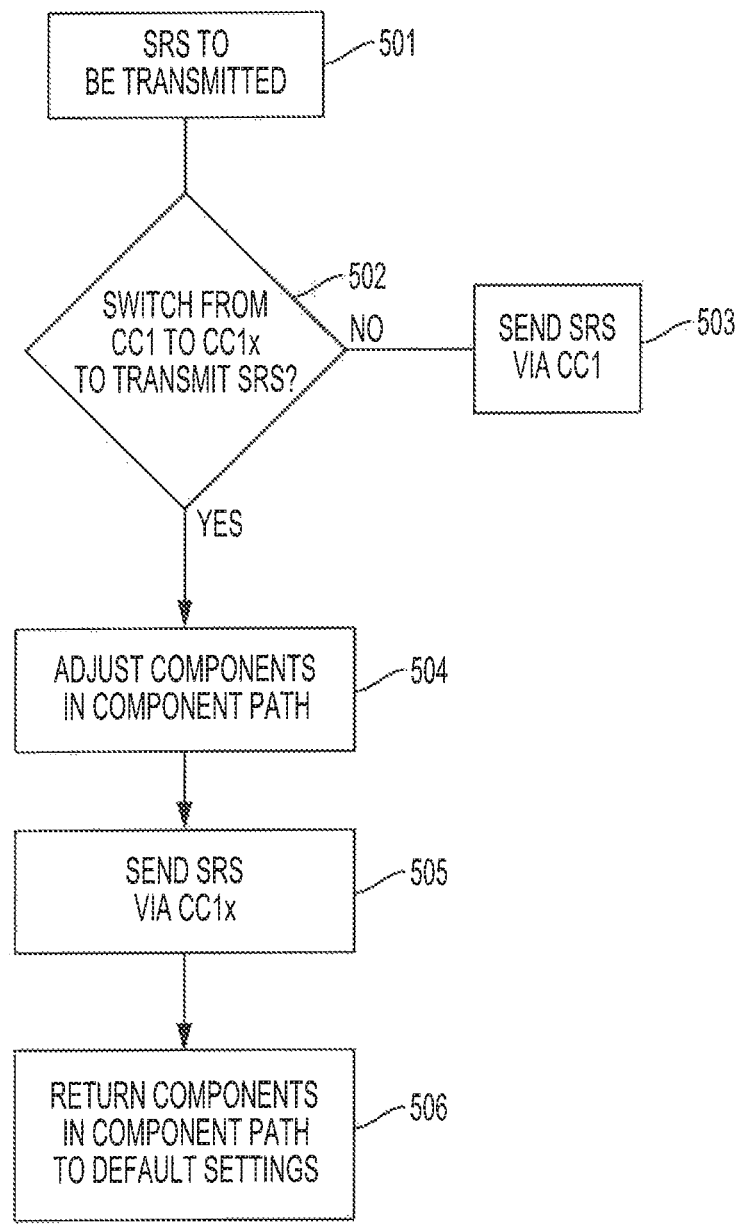
FIG. 5 is an example process according to some embodiments of the present disclosure.

FIG. 5 shows an example method of UE 115 switching CCs. In step 501, one or more processor of UE 115 is scheduled to transmit SRS or otherwise decides to transmit SRS (step 501). UE 115 determines whether it would be advantageous to transmit SRS on default CC1 or switch to CC1x or is otherwise configured to switch to CC1x at that time. The determination may be based on rules that take collision and/or prioritization into account to determine whether SRS will more be effectively communicated via CC1 or CC1x. If UE determines that SRS will be sufficiently communicated via CC1 (e.g., based at least on a threshold value, the type of information being transmitted, quality of service requirements, and/or the like), then UE may decide to communicate SRS via CC1 (step 503). In an example, if a HARQ-ACK is being transmitted on CC1, then the UE may not switch to CC1x. Because CC1 is SRS's default component carrier, components in the component path of CC1 may remain in their default settings when transmitting on CC1. In such a situation, UE 115 transmits SRS via CC1 using its default settings for the component path.

If, however, UE 115 determines that SRS may not be sufficiently communicated via CC1 (e.g., based at least on a threshold value, the type of information being transmitted, quality of service requirements, and/or the like), then UE 115 switches to CC1x and communicates SRS via CC1x. The determination may be based on collision handling and/or prioritization rules. Additionally/alternatively, if UE determines that SRS will be more effectively communicated via CC1x as compared to CC1 (e.g., comparison value), then UE 115 may switch from CC1 to CC1x. When UE 115 switches from CC1 to CC1x in order to communicate SRS, UE 115 adjusts components of the component path in a manner that will advantageously effect SRS being communicated on CC1x (step 504). For example, UE 115 may adjust the RF and/or PA within the component path of CC1x's communication. In step 505, SRS is transmitted via CC1x. Thereafter, UE 115 may switch back to its SRS default component carrier (e.g., CC1) and return CC1's components of the component path (e.g., RF, PA, etc.) back to their default settings (step 506).

In embodiments, one or more processor may decide and/or be configured to switch CC1 and CC2 as a switching group. Switching as a switching group may comprise switching CC1 to CC1x while concurrently switching CC2 to CC2x. Of course any number of CCs may be configured to switch as a switching group (e.g., CC1, CC2 CC1+n switch to CCx1, CC2x CC1+nx). A switching pair and/or switching group may be formed when one or more CCs sharing some or all components of a component path. An example of determining whether one or more CCs share some or all components of a component path and therefore should be grouped into a switching group is described above in FIG. 4. In embodiments, wherein a switching pair and/or group is established, when one CC of the switching pair/group is switched, then some or all of the CCs of the CC pair/group may be switched. For example, if one or more processor determines that it would be advantageous to switch from CC1 to CC1x to send SRS, then the one or more processor may switch some or all CCs of the switching group as well (e.g., CC1x, CC2x, CCn+1x, and so on). Further, if one or more processor determines that it would be advantageous to information intended to be transmitted on CC2 to be transmitted on CC2x, then the one or more processor may switch CC2 and some or all CCs of the switching group to as well (e.g., CC1x, CC2x, CCn+1x, and so on).

Figure 6:
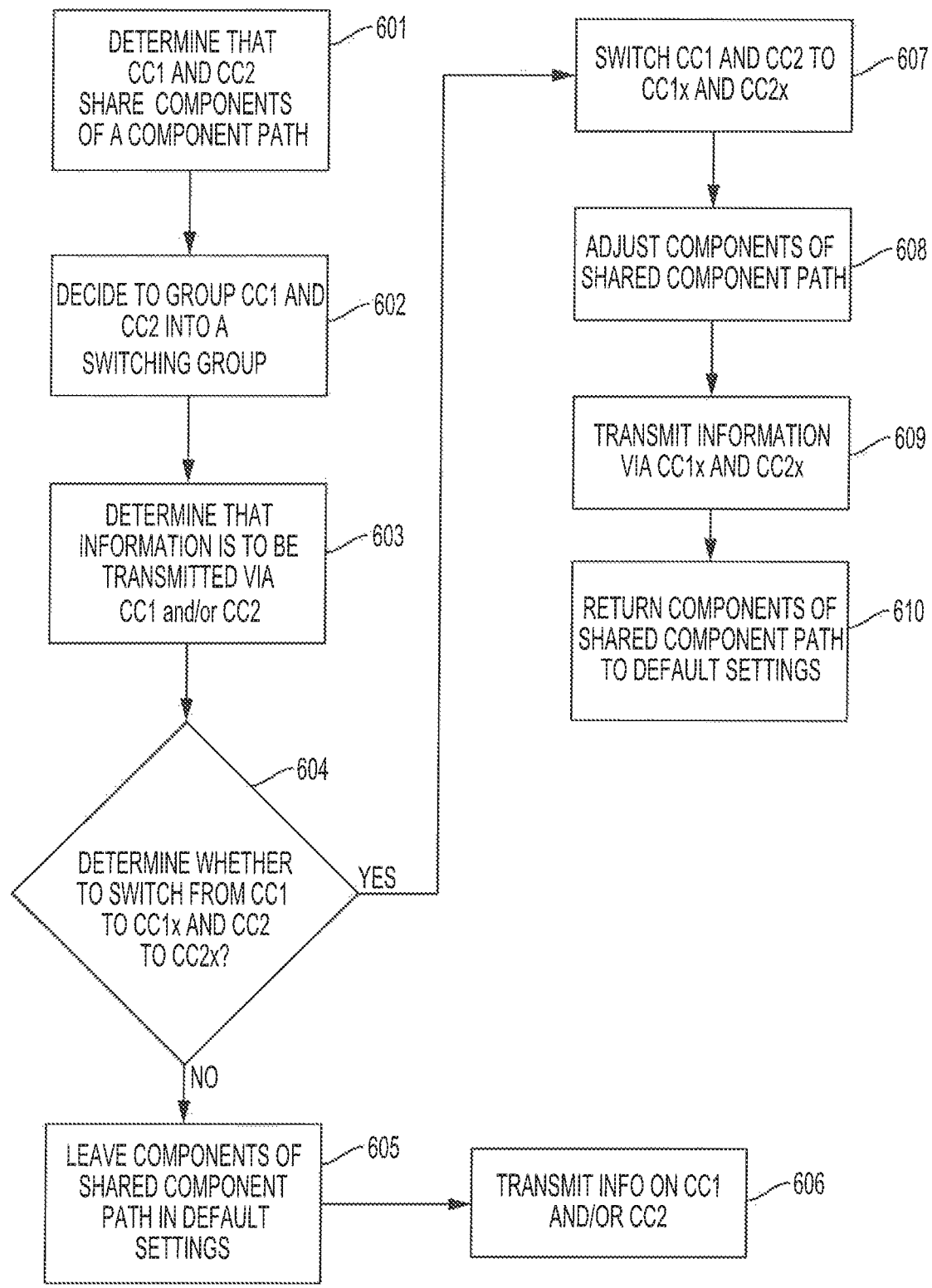
FIG. 6 is an example process according to some embodiments of the present disclosure.

FIG. 6 shows an example of switching CCs of a switching group for transmission of information. In step 601, one or more processors determines that CC1 and CC2 share a component of a component path. Based on the determination, in step 602, the one or more processors decide to group CC1 and CC2 into a switching group. In step 603, one or more processor determines that a first information is to be transmitted via CC1 and a second information is to be transmitted over CC2.

In step 604, the one or more processor determines whether the CC1 should be switched to CC1x based at least on the first information and the second information. In embodiments, the one or more processor may consider the effect on one or more CCs of a switching group when determining whether to switch one or more CCs of the switching group. Determining whether to switch from CC1 to CC1x may be based at least on a priority level assigned to information being transmitted on one or more of the CCs. For example, the one or more processor may determine that there is information to be transmitted in CC2 that has priority over SRS and or may have collision issues with SRS. The priority may be based on the type of information being transmitted, quality of service requirements, and/or the like. In this example, the one or more processors may determine not to switch CC1 to CC1x if the first information or the second information has a higher priority than the SRS transmission in CC1x. In step 604, the determination may also take into account the likely effect switching to CC1x and/or CC2x may have on the transmission intended for CC2. For example, one or more processors may determine not to switch CC1 to CC1x if the switch will interrupt a transmission on CC2 (e.g., a transmission that is currently transmitting). In another example, the one or more processor may determine that transmitting SRS on CC1x would cause a collision with information (e.g., HARQ-ACK) scheduled to be transmitted on CC2. Based on this determined potential collision, the one or more processor may decide not to switch the one or more CCs of a switching group (e.g., CC1 to CC1x).

In step 604, if the one or more processors determines not to switch from CC1 to CC1x, then in step 605, the components of the shared component path are left in their default settings. In step 606, the one or more processor may transmits the first information on CC1, the second information on CC2, and/or any other information on CCn+1. When the information is transmitted via CC1, CC2, and/or CCn+1, the components of the shared component path remain in their default settings.

If at step 604 the one or more processors decides that CC1 should be switched to CC1x, then at step 607, CC1 is switched to CC1x. In embodiments, if the one or more processors decide to switch CC1 to CC1x, and the one or more processors determine that information is present for transmission in CC2, the UE may partially or totally refrain from transmitting the information in CC2. Further, if the one or more processors decide to switch CC1 to CC1x, and the one or more processors determine that information is present for transmission in CC2, the one or more processor may wait until the information present for CC2 has finished transmitting. When the switch is made at step 607, the processor may also switch CC2 to CC2x because CC1 and CC2 are in a switching group. In step 608, the one or more processors adjust components of the shared component path as is appropriate to transmit information on CC1x and/or CC2x. In step 609, the one or more processor transmits information via CC1x. If information is available to be transmitted via CC2x, the in step 609 information may be transmitted via CC2x. When the one or more processor determines switching back to the default is scheduled or advantageous, the one or more processors switch back to CC1/CC2 and switch the component path back to default settings (step 610). In some cases, CC1 and CC2 may be identified as being in a switching group at least because CC1 and CC2 are intra-band and/or CC1x and CC2x intra-band contiguous.

Figure 7:
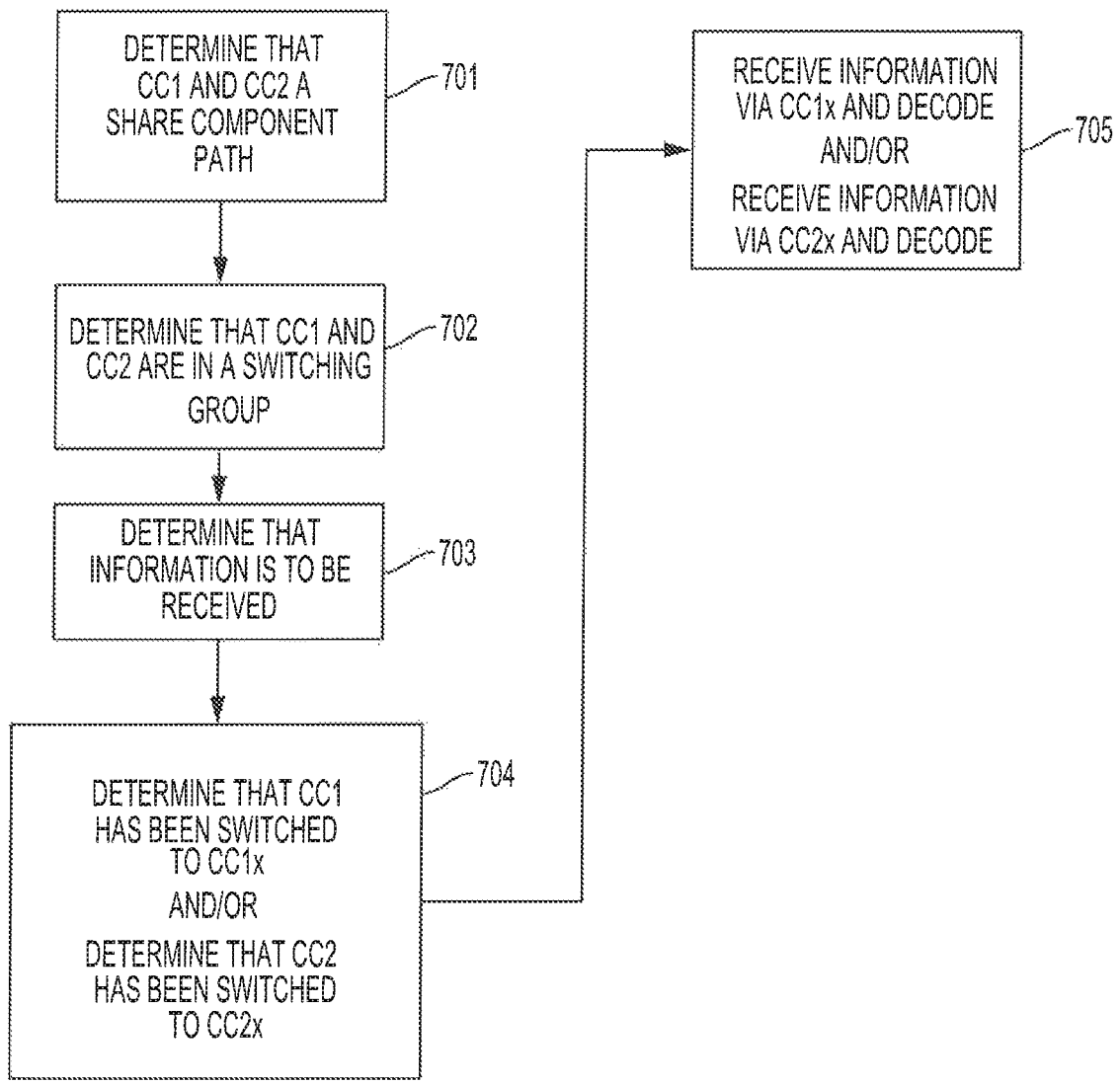
FIG. 7 is an example process according to some embodiments of the present disclosure.

FIG. 7 shows an example of receiving information, wherein CCs of a switching group have been switched. In step 701, one or more processors determines that CC1 and CC2 share a component of a component path. Based on the determination, in step 702, the one or more processors decide that CC1 and CC2 are in a switching group. In step 703, one or more processor determines that information is to be received from one or more CCs of the switching group. In step 704, the one or more processor determines that CC1 and/or CC2 have been switched to CC1x and/or CC2x. In step 705, information is received via CC1x and/or CC2x and the received information is decoded.

In embodiments involving switching groups, performance/service requirements of respective CCs of a switching group (e.g., CC1 and CC2) and/or the information being transmitted thereon may be different. As such, it may be desirable for rules applicable to one CC of a switching group to be different from rules applicable to another CC of a switching group. For example, one or more processors may apply rules to CC1 that are different from the rules applied to CC2. For instance, some or all of the CC1 conditions that trigger a switching group switch may be based on different parameters as compared to CC2 conditions that trigger a switching group switch. In another examples, some or all of the rules may be weighted differently (e.g., more strict for CC1 or more relaxed for CC1). For instance, CC1's prioritization and/or collision avoidance rules may be considered twice as important or half as important as compared to CC2's collisions avoidance and/or prioritization rules. In another example, when switching rules are based on one or more base line rules, other rules may override the base line rules. For instance, the base line rules may be conditioned on collision possibilities that may be overridden by priority of service rules, quality of service rules, network priority rules, error correction rules, ACK/NACK rules, and/or the like.

According to some embodiments, the varying rules may allow for different CCs of a switching pair to switch at different times. For example, CC1 may have comparatively more strict throughput rules as compared to CC2. In examples, conditions of CC1 may be met at a time that the conditions of CC2 are not met. In such an example, the one or more processor may switch CC1 to CC1x and refrain from switching CC2 to CC2x because the throughput rules of CC2 are able to tolerate CC2 being transmitted on the adjusted components of the shared component path. A base station may explicitly told that CC2 was not switched to CC2x and/or be able to detect that CC2 was not switched to CC2x based on the degraded and/or empty wave form of CC2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 3 may comprise processors, electronics devices, hardware devices, electronics components, logical circuits, memories, software codes, firmware codes, etc., or any combination thereof. Blocks of FIGS. 4-7 may be performed in any order, in parallel, and or serially, as desired. Further, some of the blocks of FIGS. 4-7 may be omitted as desired. Further still, some of all the blocks of FIGS. 4-7 may be performed by one or more processor at a UE and/or network device.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of switching component carriers (CC)s, the method comprising:
    determining a collision for a transmission on one or more CCs of a switching group, wherein the collision is with a physical channel transmission including hybrid automatic repeat request (HARQ)-acknowledgement (ACK) information;
    determining whether to switch the particular CC of the one or more CCs of the switching group to an alternative CC of one or more alternative CCs based on determining the collision with the physical channel transmission including the HARQ-ACK information, wherein two or more CCs of the switching group are included in the switching group based on the two or more CCs sharing a same timing advance group and a same band; and
    refraining from transmitting the transmission via the particular CC of the one or more CCs of the switching group responsive to determining not to switch the particular CC of the one or more CCs of the switching group and based on the physical channel transmission including the HARQ-ACK information.

2. The method of claim 1, wherein each CC of the switching group is included in the switching group based on:
    each CC of the switching group sharing the same timing advance group,
    each CC of the switching group sharing the same band, and
    each CC of the switching group having a same cyclic prefix.

3. The method of claim 1 further comprising determining whether to switch one or more CCs of a switching group to the one or more alternative CCs, wherein the determining is based at least on at least one of:
    a data type to be transmitted on the one or more of the CCs of the switching group during the transmitting; or
    anticipation of a transmission collision of the one or more CCs of the switching group.

4. The method of claim 1, wherein the determining whether to switch is further based on collision handling conditions, transmission prioritization conditions, or both.

5. The method of claim 1, wherein the physical channel transmission includes one of: physical uplink control channel (PUCCH) or physical uplink shared channel (PUSCH).

6. The method of claim 5, wherein the transmission comprises a sounding reference signal (SRS) transmission.

7. The method of claim 1, further comprising, prior to determining the collision:
transmitting a signal indicating the one or more CCs of the switching group.

8. The method of claim 1, wherein the one or more CCs are of the switching group when the one or more CCs are aggregated in carrier aggregation and are indicated to a network device.

9. The method of claim 8, further comprising:
determining which configured CCs share a same component path; and
determining the one or more CCs of the switching group based on determining which configured CCs share the same component path.

10. The method of claim 1, further comprising:
transmitting the physical channel transmission including the HARQ-ACK information based on determining not to switch the one CC of the one or more CCs of the switching group.

11. The method of claim 10, where the physical channel transmission is transmitted on another CC of the one or more CCs of the switching group.

12. The method of claim 1, where the switching group includes the one or more alternative CCs.

13. The method of claim 1, further comprising:
determining a second collision for a second transmission on a CC of the one or more CCs of the switching group, wherein the second collision is with a third transmission;
switching the CC of the one or more CCs of the switching group to an alternative CC of one or more alternative CCs based on determining the second collision with the third transmission; and
transmitting the second transmission via the alternative CC of the one or more alternative CCs responsive to switching the CC of the one or more CCs of the switching group.

14. The method of claim 13, further comprising:
determining whether to switch the CC of the one or more CCs of the switching group to an alternative CC of one or more alternative CCs based on a priority of the second transmission, a priority of the third transmission, or a combination thereof.

15. A system that switches component carriers (CC)s, the system comprising:
one or more processors that:
determine a collision for a transmission on a particular CC of one or more CCs of a switching group, wherein the collision is with a physical channel transmission including hybrid automatic repeat request (HARQ)-acknowledgement (ACK) information; and
determine whether to switch the particular CC of the one or more CCs of the switching group to an alternative CC of one or more alternative CCs based on the one or more processors' determination of the collision with the physical channel transmission including the HARQ-ACK information, wherein two or more CCs of the switching group are included in the switching group based on the two or more CCs sharing a same timing advance group and a same band; and
refrain from transmitting the transmission via the particular CC of the one or more CCs of the switching group responsive to determining not to switch the particular CC of the one or more CCs of the switching group and based on the physical channel transmission including the HARQ-ACK information.

16. The system of claim 15, wherein each CC of the switching group is included in the switching group based on one of the following:
each CC of the switching group sharing the same timing advance group,
each CC of the switching group sharing the same band, and
each CC of the switching group having a same cyclic prefix.

17. The system of claim 15 wherein the one or more processors determine whether to switch one or more CCs of a switching group to one or more alternative CCs, and wherein the determination is based at least on at least one of:
a data type to be transmitted on the one or more CCs of the switching group during the transmitting; or
anticipation of a transmission collision of the one or more CCs of the switching group.

18. The system of claim 15, wherein the transmission scheduled for the one CC of the one or more CCs of the switching group the comprises a sounding reference signal.

19. The system of claim 16 wherein the two or more CCs are of the switching group when the two or more CCs:
share a component path;
are aggregated in intra-band contiguous carrier aggregation; or
are aggregated in intra-band non-contiguous carrier aggregation.

20. The system of claim 15 wherein switching the one CC of the one or more CCs of the switching group to the alternative CC of the one or more alternative CCs includes:
determining to adjust at least one component of a component path shared by the two or more CCs of the switching group to the transmit the transmission.

21. The system of claim 15, further comprising:
transmitting the physical channel transmission including the HARQ-ACK information based on determining not to switch the one CC of the one or more CCs of the switching.

22. The system of claim 21, where the physical channel transmission is transmitted on another CC of the one or more CCs of the switching group.

23. The system of claim 15, further comprising:
determining a second collision for a second transmission on a CC of the one or more CCs of the switching group, wherein the second collision is with a third transmission;
switching the CC of the one or more CCs of the switching group to an alternative CC of one or more alternative CCs based on determining the second collision with the third transmission; and
transmitting the second transmission via the alternative CC of the one or more alternative CCs responsive to switching the CC of the one or more CCs of the switching group.

24. A non-transitory computer-readable medium having program code recorded thereon, which causes a system to switch one or more component carriers (CC)s, the program code comprising:

code for determining a collision for a transmission on a particular CC of one or more CCs of a switching group, wherein the collision is with a physical channel transmission including hybrid automatic repeat request (HARQ)-acknowledgement (ACK) information;

code for determining whether to switch the particular CC of the one or more CCs of the switching group to an alternative CC of one or more alternative CCs based on the collision with the physical channel transmission including the HARQ-ACK information, wherein two or more CCs of the switching group are included in the switching group based on the two or more CCs sharing a same timing advance group and a same band; and code for refraining from transmitting the transmission via the particular CC of the one or more CCs of the switching group responsive to determining not to switch the particular CC of the one or more CCs of the switching group and based on the physical channel transmission including the HARQ-ACK information.

25. The non-transitory computer-readable medium of claim 24 further comprising code for determining whether to switch one or more CCs of a switching group to the one or more alternative CCs, wherein the determining is based at least on at least one of:

a data type to be transmitted on the one or more CCs of the switching group during the transmitting; or anticipation of a transmission collision of the one or more CCs of the switching group.

26. The non-transitory computer-readable medium of claim 24, wherein the transmission comprises a sounding reference signal.

27. A method of receiving one or more component carriers (CC)s, the method comprising:

determining a collision for a transmission by another device on a particular CC of one or more CCs of a switching group, wherein the collision is with a physical channel transmission including hybrid automatic repeat request (HARQ)-acknowledgement (ACK) information;

determining whether to switch the particular CC of the one or more CCs of the switching group to an alternative CC of one or more alternative CCs based on determining the collision with the physical channel transmission including the HARQ-ACK information, wherein two or more CCs of the switching group are included in the switching group based on the two or more CCs sharing a same timing advance group and a same band; and receiving the physical channel transmission via another CC of the switching group.

28. The method of claim 27 wherein the one or more CCs are of the switching group when the one or more CCs share a component path.

29. A system that receives one or more component carriers (CC)s, the system comprising:

a processor that:

determines a collision for a transmission by another device on one or more CCs of a switching group, wherein the collision is with a physical channel transmission including hybrid automatic repeat request (HARQ)-acknowledgement (ACK) information; and determines whether to switch the particular CC of the one or more CCs of the switching group to an alternative CC of one or more alternative CCs based on determining the collision with the physical channel transmission including the HARQ-ACK information, wherein two or more CCs of the switching group are included in the switching group based on the two or more CCs sharing a same timing advance group and a same band; and one or more receivers that receive the physical channel transmission via another CC of a first CC of the switching group.

30. The system of claim 29 wherein the one or more CCs are of the switching group when the one or more CCs share a component path.

31. A non-transitory computer-readable medium having program code recorded thereon, which causes a system to receive one or more component carriers (CC)s, the program code comprising:

code for determining a collision for a transmission by another device on a particular CC of one or more CCs of a switching group, wherein the collision is with a physical channel transmission including hybrid automatic repeat request (HARQ)-acknowledgement (ACK) information;

code for determining whether to switch the particular CC of the one or more CCs of the switching group to an alternative CC of one or more alternative CCs based on determining the collision with the physical channel transmission including the HARQ-ACK information, wherein two or more CCs of the switching group are included in the switching group based on the two or more CCs sharing a same timing advance group and a same band; and code for receiving the physical channel transmission via another CC of the switching group.

32. The non-transitory computer-readable medium of claim 31 wherein the one or more CCs are of the switching group when the one or more CCs share a component path.

* * * * *